(12) United States Patent  (10) Patent No.: US 8,443,293 B2
Soerensen et al.  (45) Date of Patent: May 14, 2013

(54) BULL'S-EYE MULTIDIMENSIONAL DATA VISUALIZATION

(75) Inventors: Stella Edith Soerensen, Vekso (DK); Christian Abeln, Helsingborg (SE)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 12/966,858

(22) Filed: Dec. 13, 2010

(65) Prior Publication Data

US 2012/0151399 A1    Jun. 14, 2012

(51) Int. Cl.
 *G06F 3/048* (2006.01)
(52) U.S. Cl.
 USPC ............................ 715/764; 715/722; 715/769
(58) Field of Classification Search .................. 715/769, 715/722; 707/722, 805, 737
 See application file for complete search history.

(56) References Cited

U.S. PATENT DOCUMENTS

| | | | |
|---|---|---|---|
| 7,046,248 B1 * | 5/2006 | Perttunen | 345/440 |
| 7,418,674 B2 | 8/2008 | Robbins | |
| 7,692,653 B1 * | 4/2010 | Petro et al. | 345/440 |
| 7,788,200 B2 | 8/2010 | Crivat et al. | |
| 7,992,102 B1 * | 8/2011 | De Angelo | 715/834 |
| 2002/0054040 A1 * | 5/2002 | Moshal et al. | 345/440 |
| 2003/0071814 A1 | 4/2003 | Jou et al. | |
| 2004/0085316 A1 | 5/2004 | Malik | |
| 2004/0183800 A1 | 9/2004 | Peterson | |
| 2004/0252128 A1 | 12/2004 | Hao et al. | |
| 2006/0041447 A1 * | 2/2006 | Vucina et al. | 705/1 |
| 2007/0020588 A1 * | 1/2007 | Batcheller et al. | 434/30 |

OTHER PUBLICATIONS

Lukas Schwitter, "Virtualipo", Published Date: 2005, http://www.visualcomplexity.com/vc/project_details.cfm?id=181&index=12&domain=Business%20Networks, (1 page).
Jerome R. Hoffman, et al. "The Roulette Wheel: An Aid to Informed Decision Making", Published Date: Jun. 13, 2006 http://www.plosmedicine.org/article/info:doi/10.1371/journal.pmed.0030137, (10 pages).
Data Data—Retrieved Date: Oct. 8, 2010 http://jodiepu.com/dart/wp-content/uploads/2010/03/promption+count.png (5 pages).

\* cited by examiner

*Primary Examiner* — William Bashore
*Assistant Examiner* — Rayeez Chowdhury
(74) *Attorney, Agent, or Firm* — Workman Nydegger

(57) ABSTRACT

Embodiments are directed to presenting multiple data items with multiple attributes simultaneously. In an embodiment, a computer system accesses a plurality of data items, where each data item includes data item features and data item attributes for each feature. The computer system arranges the accessed data items in a customizable pattern that visually shows each data item's features and associated attributes. The pattern includes slices that designate the data items' features and rings that designate the data items' attributes. The computer system also presents the arranged data items on a circular base that includes multiple slices and rings, so that each data item is displayed in an appropriate slice and ring, according to the data item's corresponding features and attributes.

22 Claims, 4 Drawing Sheets

At Time T1

At Time T2

BULL'S-EYE MULTIDIMENSIONAL DATA VISUALIZATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to display information. For instance, some applications may be designed to display business management data. Such data may include items produced and sold, current location of goods or service providers or any other type of business data. Displaying business data in spread sheets or transaction logs is inefficient and cumbersome.

BRIEF SUMMARY

Embodiments described herein are directed to presenting multiple data items with multiple attributes simultaneously. In one embodiment, a computer system accesses a plurality of data items, where each data item includes data item features and data item attributes for each feature. The computer system arranges the accessed data items visually as visual nodes in a customizable layout pattern that is controlled by selected features and associated attributes of each data item. The pattern includes slices that designate the data items' features and rings that designate the data items' attributes. The computer system also presents the arranged data items on a circular base that includes multiple slices and rings, so that each data item is displayed in an appropriate slice and ring, according to the data item's corresponding features and attributes.

In another embodiment, a computer system accesses a plurality of data items, where each data item includes data item features and data item attributes for each feature. The computer system arranges the accessed data items in a customizable pattern that visually shows each data item's features and associated attributes. The pattern includes slices that designate the data items' features and rings that designate the data items' attributes. The computer system also presents the arranged data items on a circular base that includes multiple slices and rings, so that each data item is displayed in an appropriate slice and ring, according to the data item's corresponding features and attributes. The presentation of the data items is dynamically updateable, so that updates to the data items' features or attributes are automatically updated. The computer system receives user input indicating that at least one of the data items is to be updated and dynamically updates the indicated data items according to the received user input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
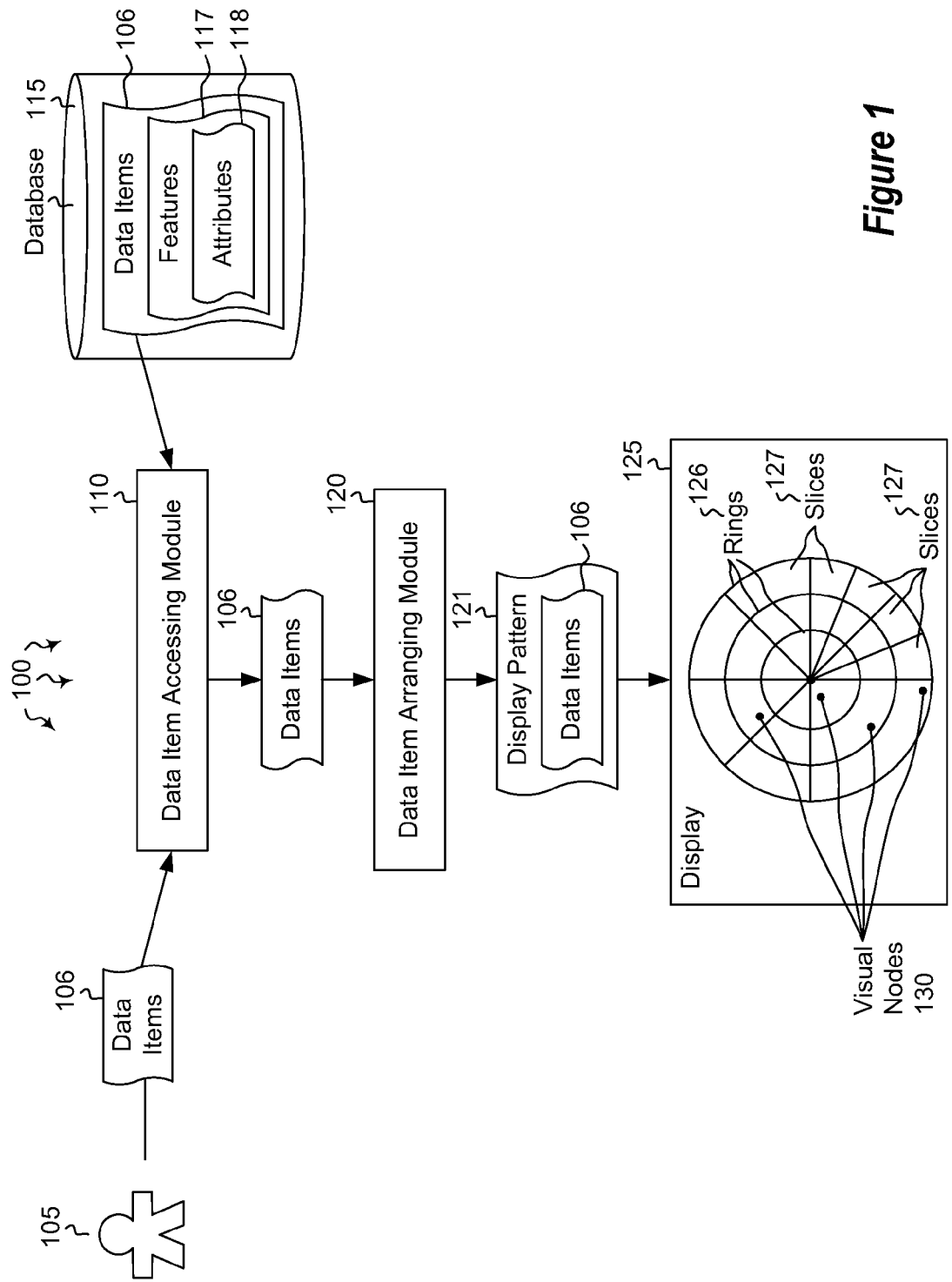
FIG. 1 illustrates a computer architecture in which embodiments of the present invention may operate including presenting multiple data items with multiple attributes simultaneously and dynamically updating presentation data items.

Embodiments described herein are directed to presenting multiple data items with multiple attributes simultaneously. In one embodiment, a computer system accesses a plurality of data items, where each data item includes data item features and data item attributes for each feature. The computer system arranges the accessed data items visually as visual nodes in a customizable layout pattern that is controlled by selected features and associated attributes of each data item. The pattern includes slices that designate the data items' features and rings that designate the data items' attributes. The computer system also presents the arranged data items on a circular base that includes multiple slices and rings, so that each data item is displayed in an appropriate slice and ring, according to the data item's corresponding features and attributes.

In another embodiment, a computer system accesses a plurality of data items, where each data item includes data item features and data item attributes for each feature. The computer system translates and maps selected features and associated attributes of each data item to visual attributes of the visual nodes. The visual attributes may include color, size and/or shape. In one embodiment, the visual nodes reflect the representation of a pin-needle, who's visual attributes include the color, size and shape of the head of the pin-needle. The computer system may control the visual attributes according to the data item features and data item attributes, using an established mapping.

In another embodiment, a computer system accesses a plurality of data items, where each data item includes data item features and data item attributes for each feature. The computer system arranges the accessed data items in a customizable pattern that visually shows each data item's features and associated attributes. The pattern includes slices that designate the data items' features and rings that designate the data items' attributes. The computer system also presents the arranged data items on a circular base that includes multiple slices and rings, so that each data item is displayed in an appropriate slice and ring, according to the data item's corresponding features and attributes. Both the presentation of the data items in the arrangement and the visual attributes of the visual nodes are dynamically updateable, so that updates to the data items' features or attributes are automatically updated. The computer system receives user input indicating that at least one of the data items is to be updated and dynamically updates the indicated data items according to the received user input.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes display 125. Display 125 may be any type of computer or other display capable of displaying electronic information. The display may be configured to display data items 106 in various different patterns. Data items 106 may include any type of information including information about products, people, logistics, organizations or any other type of information.

Data items may be accessed by data item accessing module 110. The data items may be received from a user (e.g. user 105), from a database (e.g. database 115) or from any other source or combination of sources. Each data item may include features 117 and/or attributes 118. A feature may be a product characteristic or product feature, while an attribute may be a property or current setting for a feature. For example, if data item 106 were a software product, and feature 117 were a software feature such as email, attribute 118 may indicate the feature's completion status, or expected completion date, or other information. This, of course, is just one example of many different possible examples of data items, features and attributes. As such, the above example is intended merely for illustration purposes and is not intended to limit the scope of data items, features or attributes.

The accessed data items 106 may be sent to data item arranging module 120. Module 120 may arrange the data items according to a display pattern, and send the arranged data items to display 125. The data items may be arranged as visual nodes 130 on a circular base or structure which includes various rings 126 and slices 127. The circular structure may resemble a bull's-eye shape and structure common on dart boards or targets. The slices may be used to designate a given feature, while the rings may be used to indicate an attribute of the feature. Thus, in the example above, if a data item were shown for a software product, one of the slices may correspond to the email feature. Thus, the data item's visual node with the email feature would be placed in the slice for the email feature. Each ring in the email feature slice may indicate how much progress has been made toward releasing or completion of the email feature. Thus, if the feature is at the beginning stages of development, the visual node may be placed on (or near) an outer ring. As the feature gets closer to completion, it may be moved inward, toward the center of the circular base. Thus, a feature's completion status attribute may be shown at each step as the feature approaches completion.

In some embodiments, a visual representation may be generated which helps end users to visualize multiple data items in various different stages. This visual representation may represent a plurality of different data items and their respective features and attributes. In some cases, the visual representation may be designed in a dartboard, bull's-eye or similar pattern. The dartboard pattern may include a circular base or floor as the surface for displaying data items 106. The surface may implement spatial boundaries (e.g. rings or slices) for categorizing data items in the layout in areas of circular rings (of possibly varying widths) and slices (of possibly varying angles). Other shapes and spatial boundaries may be used in other embodiments. In some cases, the center of the circular surface may represent a goal that is to be achieved over time.

The borders of the various areas may be visually indicated with lines of various widths and/or colors. Individual data items may be represented by a visual representation (e.g. a dot or other shape) and may highlight attributes of various visual features. In some embodiments, data items' visual nodes may be represented by colored pins with pinheads of different sizes and colors. Data items may be allocated in various rings and slices according to features and attributes.

For example, a feature represented by a slice 127 on the circular base may be used to visualize the association of a data item to a country, a warehouse, a storage location, a store shelf or other associated location. Availability of an item in a given region (e.g. one country/one warehouse/storage etc.) may be indicated by a given slice in the presentation, while stage in production of the item may be indicated by subdividing the slice using a ring. The stage of production of a data item may be indicated by depth or positioning of the representative pinhead within a ring and slice. Thus, a data item's visual node may represent further dimensions and the relationships in which the values of these dimensions live. The visualization may include the placement of a value for an attribute of a data item in the possible range of value for an attribute.

In some embodiments, the visualization may also show the historical changes of attributes over time, for multiple data items simultaneously. The visualization uses a play back mechanism, which converts the changes over time into animations of placement and other respective visual attributes of the data items. A timeline may be implemented as part of the visualization that may be used to position the current time or start, stop, or pause the animation. Such interactivity may allow end users to manipulate attributes of data items by interacting with the visual elements. For example, user 105 may move a visual node 130 that represents a data item on the surface in order to change the attribute to which it corresponds.

As mentioned above, display 125 may display a data item presentation or visualization. The presentation may include a variable (and customizable) number of rings and slices, of variable (and customizable) size. In some cases, certain colors may indicate that a work flow is complete. Each ring on the board may indicate a step in the management flow of the work flow. In one example, a presentation may include five rings. The outer ring may indicate the first step in the work flow. Each pie section may the discreet area to which the management flow can be applied.

In another example, a presentation or visualization may include sixteen slices, where each slice represents a different European country. Each slice may be divided into five workflow stages. Stage one may be indicated by the outer circle. Each data item's representative pin (e.g. visual node 130) and each pin's color may indicate a given data item. For example, a yellow pin may correspond to a user manual. Thus, yellow pins may be used in each slice to indicate the progress of the user manual for each European country. Various rings in the slices may indicate a range of progress from still being written to being in translation to almost complete and ready for shipment. Placement of each representative pin in a slice may indicate that the data item is available in that country and where in the work flow that item currently is. Pin placement may also be seen in relationship to other pie sections. Depth of pin in each section may indicate completeness of that part of the section. Completeness may also be indicated by how close to or how far away from the next section the pin has been placed.

Another example may include delivery of organ parts from donors to patients with a colored pin indicating what organ was available in which country. Thus, for example, if a heart was needed in Holland, a red pin may be placed on the outer ring of Holland's slice showing a need for a heart. The center of the visualization may have a red pin in a different slice showing that a heart is available in another country (e.g. Australia). That heart could be transported to Holland in a certain amount of time. The visualization may further show that two hearts (each represented by red pins) look to be either "possibly available" (as indicated by a next inner ring) or "almost available" (as indicated by a next inner ring) in another country's slice (e.g. Italy). Using this data, a professional may determine whether to wait for a heart from Italy or to take the one available in Australia, with the added shipment time. One skilled in the art will realize that the above example is merely one example of many possible embodiments.

Figure 2:
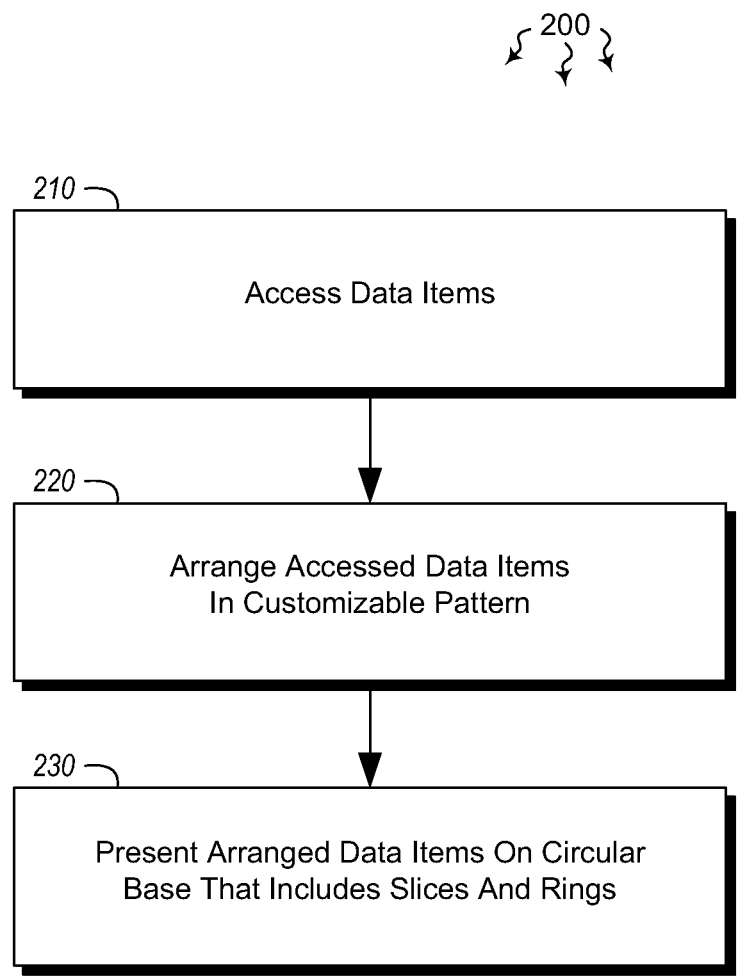
FIG. 2 illustrates a flowchart of an example method for presenting multiple data items with multiple attributes simultaneously.
Figure 3:
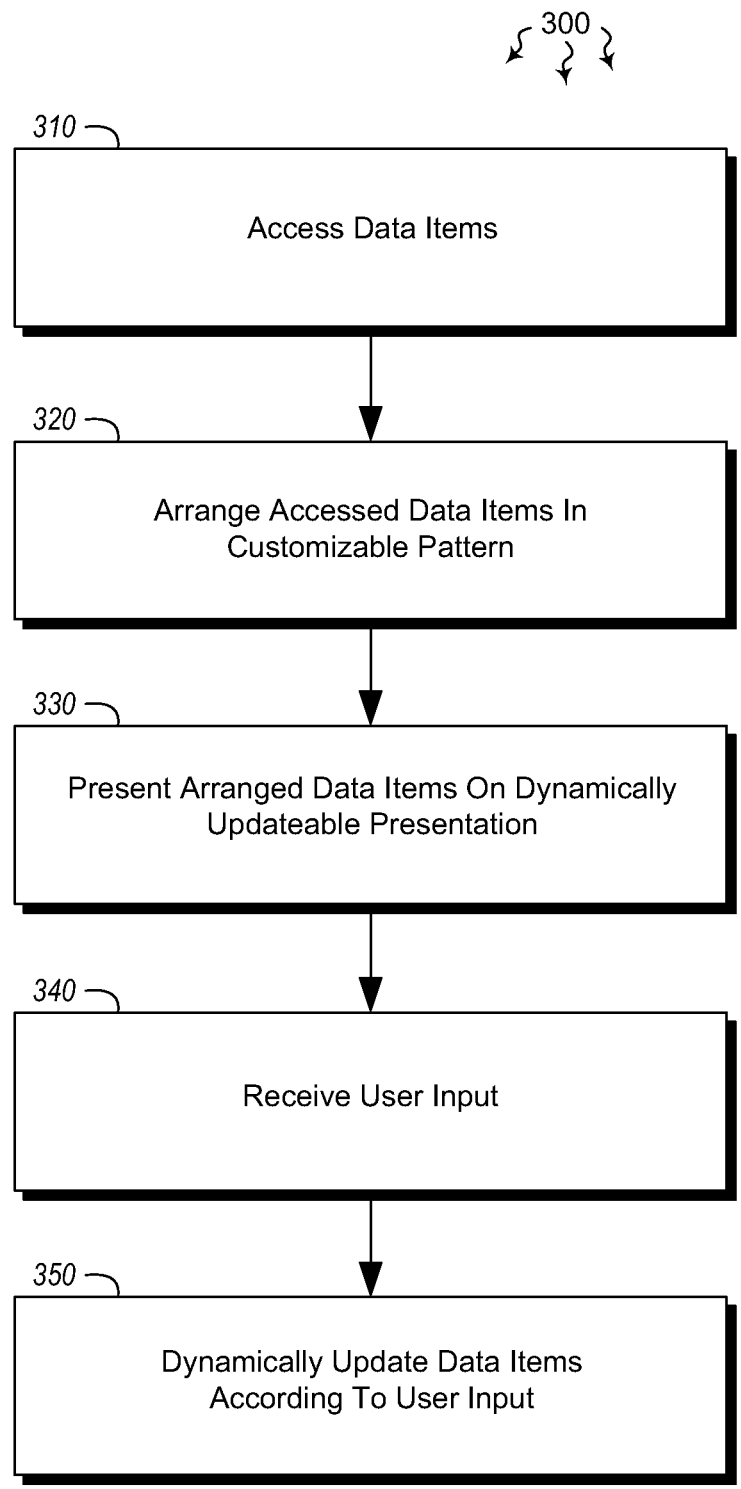
FIG. 3 illustrates a flowchart of an example method for dynamically updating presentation data items.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for presenting multiple data items with multiple attributes simultaneously. The method 200 will now be described with frequent reference to the components and data of environments 100 and 400 of FIGS. 1 and 4A/4B, respectively.

Method 200 includes an act of accessing a plurality of data items, each data item including one or more data item features and one or more data item attributes for each feature (act 210). For example, data item accessing module 110 may access data items 106 from either or both of user 105 and database 115. The data items may include data item features 117 and data item attributes 118. Each feature may have multiple different attributes. The attributes may describe various properties, characteristics, settings, current state or other attributes of a feature.

Method 200 includes an act of arranging the accessed data items visually as visual nodes in a customizable layout pattern that is controlled by selected features and associated attributes of each data item, wherein the pattern includes slices that designate the data items' features and rings that designate the data items' attributes (act 220). For example, data item arranging module 120 may arrange visual nodes 130 which correspond to accessed data items 106 in a customizable display pattern 121 that shows each data item's features 117 and associated attributes 118. In some cases, the customizable pattern 121 includes slices or pie sections that designate an item's features and rings that designate the data item's attributes.

For instance, as shown in display 125, a visualization with a customizable pattern may include various rings 126 and slices 127. Those data items' visual nodes 130 displayed in a given slice may share a common feature. The slices may be of varying sizes and may include a varying number of data items. Data items may be represented on the visualization as pins (or other shapes). Each pin placed in a given slice may be assumed to have that feature. Accordingly, in an example where the data item is a user manual, each slice may represent a different country. Each ring may indicate a level of completion with the innermost ring (or center) indicating completion or a "shipped" status. Other data items (perhaps represented by different colored pins or by different shapes) may also be shown in the visualization, along with the user manual data items. For instance, pins (or other objects) representing other data objects such as a user interface may be placed alongside the other pins. Each user interface pin may indicate the user interface's completion status in various countries. Accordingly, many different data items' features and attributes may be viewed simultaneously.

As mentioned above, those data items displayed in a given ring may share a common attribute 118. Those data items displayed in a certain slice and ring may share both a common feature 117 and a common attribute 118. In some cases, the presentation shown in display 125 may include sub-rings and sub-slices, where the sub-rings and sub-slices identify other, different attributes and features that are subsets or are related to the parent rings or slices. The display may include a configurable drill-in and drill-out that shows and may specifically drill-in and out of selected rings, slices, sub-rings or sub-slices. Accordingly, a user may drill in (or out) gradually or in increments (e.g. one ring at a time) until a desired level is reached. Additionally or alternatively, a zoom feature may be provided which allows the user to zoom in (or out) on data within a particular ring, slice, sub-ring or sub-slice.

Method 200 includes an act of presenting the arranged data items on a circular base comprising a plurality of slices and rings, such that each data item is displayed in an appropriate slice and ring, according to the data item's corresponding features and attributes (act 230). For example, data items 106 arranged according to display pattern 121 may be presented in display 125 with one or more rings 126 and slices 127. In the display, each data item's visual node is displayed in an appropriate slice and ring, according to the data item's corresponding features 117 and attributes 118.

Figure 4B:
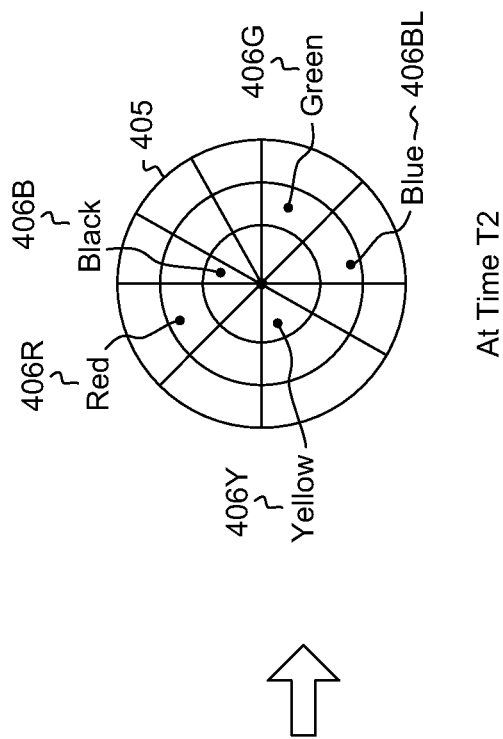
FIGS. 4A and 4B illustrate an embodiment of the present invention in which a data item presentation is automatically updated.
Figure 4A:
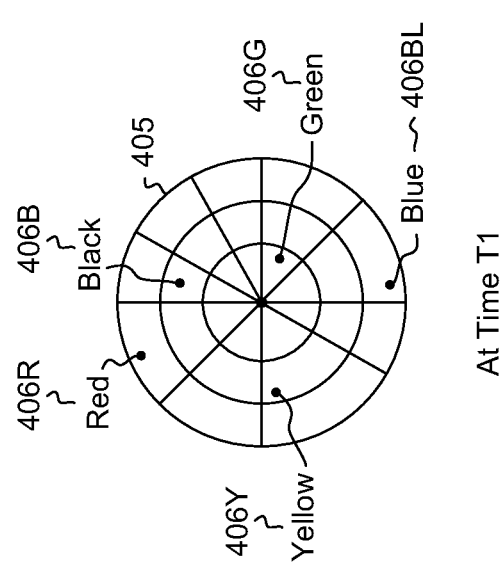

As shown in FIG. 4A, data items may be represented in the presentation using pins (e.g. 406Y) or other visual nodes that are inserted into the circular base 405. The pins may be of different colors: yellow (406Y), red (406R), black (406B), green (406G) and blue (406BL). Of course, more or fewer colors may be used. Each color may represent a different product, product feature or other item. As shown in FIG. 4, each data item's visual node may be place in different slices and in different rings. It should be noted that multiple visual nodes may be placed in each slice and/or ring, and that substantially any number of data items may be represented in a given representation.

In some embodiments, the location and/or depth of insertion for each pin may indicate the corresponding data item's development stage. Accordingly, if a pin is sticking out further or is further toward the base's center within a given ring, it may be a less developed data item, while a ping sticking further into the base or is positioned farther away from the base's center may represent a more developed data item. In this manner, location and depth of insertion may indicate further attributes or degrees of attributes for a data item.

The presentation shown in display 125 may be dynamically updateable. As such, updates to the data items' features or attributes may be automatically updated. Accordingly, as data items' features and attributes change, the representative icons (e.g. pins) are automatically updated in the display. Additionally or alternatively, if a user moves a data item's visual node within the presentation (e.g. to another ring and/or slice), that item's feature and/or attribute data may be updated accordingly. As data item data is changed, the state of each feature and attribute may be recorded over a specified period of time. Accordingly, a user or software program can look back and see the former states of each data item. Moreover, in some cases, a means may be provided to play back in the displayed presentation the state changes recorded over a specified period of time.

Turning now to FIG. 3, FIG. 3 illustrates a flowchart of a method 300 for dynamically updating presentation data items. The method 300 will now be described with frequent reference to the components and data of environments 100 and 400 of FIGS. 1 and 4A/4B, respectively.

Method 300 includes an act of accessing a plurality of data items, each data item including one or more data item features and one or more data item attributes for each feature (act 310). For example, data item accessing module 110 may access data items 106. The data items may be accessed from a user 105, from a database 115 or from some other source. Each data item has different features 117 and each feature may have one or more attributes 118. The data items' visual nodes are arranged in a customizable pattern that visually shows each data item's features and associated attributes, wherein the pattern includes slices that designate the data items' features and rings that designate the data items' attributes (act 320). For instance, data item arranging module 120 arranges the data items in a customizable display pattern 121 that visually shows each data item's features and attributes.

Method 300 includes an act of presenting the arranged data items on a circular base comprising a plurality of slices and rings, such that each data item's visual node is displayed in an appropriate slice and ring, according to the data item's corresponding features and attributes, wherein the presentation of the data items' visual nodes is dynamically updateable, such that updates to the data items' features or attributes are automatically updated (act 330). For example, as shown if FIG. 4A, data items 406(Y-BL) may be arranged on circular base 405 which includes slices 127 and rings 126. The presentation of the data items' visual nodes is dynamically updateable so that when feature or attributes change, the visual node's location in the presentation is updated. Moreover, if a user relocates a data item, that data item's features and/or attributes are automatically updated.

In some cases, the rings 126 may have varying and different widths. Thus, some rings may be larger or smaller and more or less granular in their detail. Moreover, as indicated above, rings and slices may include sub-rings and sub-slices, which may show additional levels of details and/or additional attributes or features. Similarly, some slices may be larger or smaller and more or less granular in their detail. These slices may be at different angles to form larger pie sections. The center of the circular base may comprise a goal toward which the data items (e.g. represented by pins in some cases) are progressing over time.

Method 300 includes an act of receiving user input indicating that one or more data items are to be updated (act 340). For example, input may be received from user 105 indicating that data items 106 are to be updated. The indicated data items may be dynamically updated according to the received user input (act 350). For example, if a user edits a data item's attributes, the data item's visual node is repositioned accordingly on the presentation. Similarly, if a user relocates a data item's visual node in the presentation, that item's features and/or attributes are updated accordingly. Each time a data item's data or state is changed, the state changes for the data item may be recorded and configured for playback in animation form. The playback may show state changes over a user-specified period of time, or may simply show all changes to the data item from beginning to end.

Accordingly, systems, methods and computer program products are provided which display multiple data items with multiple features and attributes simultaneously. Moreover, systems, methods and computer program products are provided which dynamically update data items' visual nodes upon relocation of a visual node within a presentation or editing of data item attributes or features.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, in a computer networking environment including a plurality of computing systems, a computer-implemented method for presenting multiple data items having corresponding attributes related to stages of progression and in a manner that reflects the current progression associated with each of the multiple data items simultaneously, the method comprising:
    an act of accessing a plurality of data items, each data item being associated with a corresponding data item feature and at least one data item attribute, the at least one data item attribute comprising a current stage of progression associated with the corresponding data item feature;
    an act of arranging the accessed data items visually as visual nodes in a customizable layout pattern that is controlled by selected features and associated attributes of each data item, wherein the pattern includes a plurality of slices that designate corresponding different data item features and a plurality of rings that designate corresponding different data item attributes, each of the corresponding different data item attributes comprising a different stage of progression with interior rings representing a greater degree of progression than outer rings in the plurality of rings; and
    an act of visually presenting markers associated with corresponding arranged data items on a displayed circular base that includes the plurality of slices and rings, such that each data item is visually represented in an appropriate slice and ring, according to the current stage of progression associated with each data item's corresponding data item feature, such that a marker associated with a particular data item will be displayed only within the appropriate slice and ring corresponding to the current stage of progression associated with that particular data item's feature, wherein at least one marker is represented in the presentation with a graphical object representing a pin that is visually inserted into the circular base, and wherein at least one of a position of the pin and a depth of insertion of the pin further indicates the current stage of progression.

2. The method of claim 1, wherein the data items displayed in a given slice share a common feature.

3. The method of claim 1, wherein the data items displayed in a given ring share a common attribute.

4. The method of claim 1, wherein the data items displayed in both an identified slice and ring share both a common feature and a common attribute.

5. The method of claim 1, wherein the presentation of the data items is dynamically updateable, such that updates to the data items' features or attributes are automatically updated.

6. The method of claim 5, wherein the pins representing the data items are automatically moved to at least one of a different slice and a different ring.

7. The method of claim 5, further comprising recording state changes for each data item over a specified period of time.

8. The method of claim 7, further comprising playing back in the displayed presentation the state changes recorded over a specified period of time.

9. The method of claim 1, wherein attributes and features may be set by dragging the data item's representative pin to another slice or ring.

10. The method of claim 1, wherein different types of data items are represented by different types of pins.

11. The method of claim 1, wherein the presentation includes at least one of a plurality of sub-rings and a plurality of sub-slices, wherein the sub-rings and sub-slices identify other, different attributes and features.

12. The method of claim 11, wherein the presentation includes a configurable drill-in and drill-out feature that shows specified rings, slices, sub-rings or sub-slices.

13. A computer system comprising the following:
    one or more processors;
    system memory;
    one or more computer-readable storage media having stored thereon computer-executable instructions that, when executed by the one or more processors, causes the computing system to perform a method comprising:
    an act of accessing a plurality of data items, each data item being associated with a corresponding product and a current stage of completion of the product;
    an act of arranging the accessed data items visually as visual nodes in a customizable layout pattern, wherein the pattern includes a plurality of slices that designate corresponding different products and a plurality of rings that designate corresponding different stages of completion for the different products, with interior rings representing a greater degree of product completion than outer rings in the plurality of rings; and
    an act of visually presenting markers associated with the arranged data items on a visual representation the plurality of slices and rings of the pattern, such that each data item is visually represented by a marker in only the appropriate slice and ring corresponding to the current stage of completion of the product, wherein at least one marker is represented in the presentation with a graphical object representing a pin that is visually inserted into the visual representation, and wherein at least one of a position of the pin and a depth of insertion of the pin further indicates the current stage of completion.

14. The system of claim 13, wherein the markers include a plurality of different types of markers, the of the plurality of markers being displayed with at least one of a different color or size and corresponding to different types of products.

15. A computer program product for implementing a method for dynamically updating presentation data items, the computer program product comprising one or more computer-readable storage media having stored thereon computer-executable instructions that, when executed by one or more processors of the computing system, cause the computing system to perform the method, the method comprising:
  an act of accessing a plurality of data items, each data item being associated with a corresponding feature and a current stage of completion, progression or availability of the data item in the corresponding area;
  pattern, wherein the pattern includes a plurality of slices that designate corresponding different data item features and a plurality of rings that designate corresponding different stages of completion, progression or availability, with interior rings representing a relatively greater degree of completion, progression or availability than outer rings in the plurality of rings; and
  an act of visually presenting markers associated with the arranged data items on a visual representation the plurality of slices and rings of the pattern, such that each data item is visually represented by a corresponding marker in only the appropriate slice and ring that corresponds to the current completion, progression or availability of each data item in the corresponding area, wherein at least one marker comprises a graphical object representing a pin that is visually inserted into the visual representation, and wherein at least one of a position of the pin and a depth of insertion of the pin further indicates the current stage of completion, progression or availability.

16. The computer program product of claim 15, wherein the method further includes:
  an act of receiving user input indicating that one or more data items are to be updated; and an act of dynamically updating the indicated data items according to the received user input.

17. The computer program product of claim 16, wherein the circular base includes a plurality of rings, wherein at least two of the rings have a different width.

18. The computer program product of claim 16, wherein the circular base comprises a plurality of slices, wherein at least two of the slices are of a different angle.

19. The computer program product of claim 16, wherein center of the circular base comprises a goal toward which the pins are progressing over time.

20. The computer program product of claim 16, wherein state changes for the data items are recorded and configured for playback in animation form.

21. The computer program product of claim 15, wherein the markers include a plurality of different types of markers, the of the plurality of markers being displayed with at least one of a different color or size and corresponding to different types of products.

22. The computer program product recited in claim 15, wherein the corresponding different data item features comprise different geographical areas.

* * * * *